United States Patent [19]

Maier et al.

[11] Patent Number: 5,211,115
[45] Date of Patent: May 18, 1993

[54] TRANSPORTING DEVICE

[75] Inventors: Gernot Maier, Stuttgart; Rainer Utz, Waiblingen; Han-Jochen Kollek, Illingen; Hans Erne, Waiblingen; Jochen Schramm, Heilbronn; Thomas Schmid, Ludwigsburg; Stefan Reitmeier, Waiblingen-Hohenacker; Ulrich Müller, Korb, all of Fed. Rep. of Germany

[73] Assignee: Robert Bosch GmbH, Stuttgart, Fed. Rep. of Germany

[21] Appl. No.: 768,888

[22] PCT Filed: Apr. 26, 1991

[86] PCT No.: PCT/DE91/00350
§ 371 Date: Oct. 18, 1991
§ 102(e) Date: Oct. 18, 1991

[87] PCT Pub. No.: WO91/17020
PCT Pub. Date: Nov. 14, 1991

[30] Foreign Application Priority Data

May 8, 1990 [DE] Fed. Rep. of Germany ....... 4014701

[51] Int. Cl.⁵ .................. B23Q 7/00; B65G 35/00
[52] U.S. Cl. .................. 104/288; 180/168; 104/249

[58] Field of Search ............... 104/287, 288, 295, 296, 104/299, 300, 301, 303, 304, 249, 88; 180/168, 279, 275

[56] References Cited

U.S. PATENT DOCUMENTS

| 3,870,939 | 3/1975 | Robert | 104/300 |
| 3,941,202 | 3/1976 | Sorkin | 104/300 |
| 3,974,778 | 8/1976 | Black et al. | 104/299 |
| 4,245,715 | 1/1981 | Loomer | 180/279 |
| 4,284,160 | 8/1981 | Deliban et al. | 104/299 |
| 4,288,121 | 9/1981 | Wiechert | 180/279 |
| 4,520,889 | 6/1985 | Abe et al. | 104/88 |
| 4,613,804 | 9/1986 | Swenson | 104/88 |
| 5,036,935 | 8/1991 | Kohara | 180/168 |

FOREIGN PATENT DOCUMENTS 0285527 10/1988 European Pat. Off. .

Primary Examiner—Mark T. Le
Attorney, Agent, or Firm—Michael J. Striker

[57] ABSTRACT

A transporting device has at least one autonomous workpiece carrier provided with an electric device and a drive control, and a path system provided with a plurality of stations. The workpiece carrier is provided with a unit for determining the operational parameter of the workpiece carrier and reacting to the deviation of the operational parameter from a predetermined value.

14 Claims, 4 Drawing Sheets

TRANSPORTING DEVICE

BACKGROUND OF THE INVENTION

The invention relates to a transporting device having self-propelled workpiece carriers each constructed as a car, carriage or the like and having a system to control movement of the carriers. Such a transporting device is described in European patent application EP-OS 0 285 527. The device comprises a rail network on which autonomous cars move. The cars carry their own drive and their own power source with them. Stations, at which workpieces transported by the car are machined, are arranged along the rail network. Every car is equipped with a plurality of sensors and switches, by means of which travel control commands are transmitted to the car by means of signal transmitters arranged in the travel path. An optical distance sensor directed to the front is arranged at the front side. An inductive sensor which is actuated by means of signal strips arranged on the drive path is located on the bottom of the car. In addition, a mechanical switch which is actuated by means of barriers arranged in the travel path is located on the bottom of the car. An additional switch constructed in the form of a rocker is located at the front side of the car. This sensor switch system controls all movements of the car in normal operation. A car travels at maximum drive output insofar as there is no other control signal. Signal strips are arranged on the travel path prior to stopping points. The car initiates a braking process which reduces the speed of the car to a minimum residual speed after detecting the signal strip by means of the inductive sensor on the bottom. It reaches the stopping point at this crawl speed where it is stopped by means of the actuation of the switch on the bottom via a barrier arranged in the travel path. After lifting up the barrier, the car resumes movement at maximum output. If the distance sensor detects an obstacle or a car moving ahead of it, the car likewise brakes to crawl speed. If the obstacle is immovable, it runs against the obstacle at crawl speed. The impact then actuates the rocker at the front side and the car is accordingly stopped. If the obstacle is removed and/or the pressure on the front rocker is relieved, the car resumes its movement at full output. To a limited degree, the sensor switch system makes it possible to control the car also in irregular operating situations, e.g. when there is an obstacle on the travel path. This is detected by the distance sensor which then initiates a braking process. The car collides against the obstacle at crawl speed and is stopped by means of the front rocker which is accordingly actuated.

However, if the distance sensor is defective or does not detect the obstacle for other reasons, the impact against the obstacle takes place at full speed. The car is also stopped by means of the actuation of the front rocker in this instance. Movement continues when the pressure force on the front rocker is removed. In the case of movable obstacles, this can result in the car pushing the obstacle backwards in front of it without being decisively stopped. In the same situation, if the distance sensor is operational but the front rocker is defective this results in the car "driving against" the obstacle, wherein the car constantly tries to achieve the crawl speed. With heavy or virtually immovable obstacles this can easily lead to an overloading of the motor. There is an increased risk of personal accidents if e.g. a hand is pinched by a car with a defective distance sensor. On the other hand, if the inductive sensor on the bottom of the car is defective this results in the car driving into a stopping point at maximum speed, where it is abruptly stopped by means of the actuation of the switch on the bottom. After the stop barrier is removed, the car resumes its travel at maximum output and moves into the next stopping point in the same manner, that is, at maximum speed. Thus, the defective bottom inductive sensor is not discovered.

It is the object of the present invention to increase the reliability of such a transporting device.

SUMMARY OF THE INVENTION

A transporting device having at least one workpiece carrier such as a car, the workpiece carrier comprising means for controlling movement of the workpiece carrier, the controlling means including means for processing signals supplied in a recognizable time sequence representative of movement of the workpiece carrier with respect to other objects, the controlling means stopping the carrier when the time sequence of the signals is unrecognizable.

A first transporting device, according to the invention, provides a signal evaluating logic which stops a car when a signal sequence occurs which is not possible based on the time flow. For example, cars which drive into a stopping area without braking because of a defective bottom inductive sensor are immediately permanently stopped.

Another transporting device, according to the invention, provides a two-stage front switch constructed in the form of a rocker which permanently stops a car when there is a very hard impact. The front switch is described as a series of light barriers which are interrupted as a function of the hardness of impact.

Another transporting device, according to the invention, provides a shock sensor which stops a car at a very hard impact when activated.

Further, in another transporting device according to the invention, a power consumption monitoring arrangement is provided which stops the car when the motor is overloaded beyond an allowable time period.

Further, a desired combination of the devices according to the invention, is particularly advantageous. On the one hand, the combination has the advantage that when one individual system fails another one can take over its function. In this way, the reliability of a transporting device, according to the invention, can be significantly increased. For example, if the car moves against a soft obstacle without braking and the front rocker does not respond with the second switch stage, the power consumption monitoring arrangement stops the car. The power consumption monitoring arrangement likewise stops the car when the shock sensor does not respond to an impact against an obstacle in the absence of braking. For example, if the signal evaluating logic fails, the car is stopped at a stopping point by activation of the shock sensor. Another substantial advantage of a combination consists in a jointly supported determination of a danger threshold, so that a shorter and/or more sensitive reaction to danger or ambient conditions is possible.

The present invention both as to its construction so to its mode of operation, together with additional objects and advantages thereof, will be best understood from the following description of preferred embodiments

DETAILED DESCRIPTION OF THE PREFERRED EMBODIMENT

The transporting device, according to the invention, contains a rail network which can be branched and includes machining stations autonomous workpiece carriers. Hereinafter cars, which move on the rail network.

Figure 1:
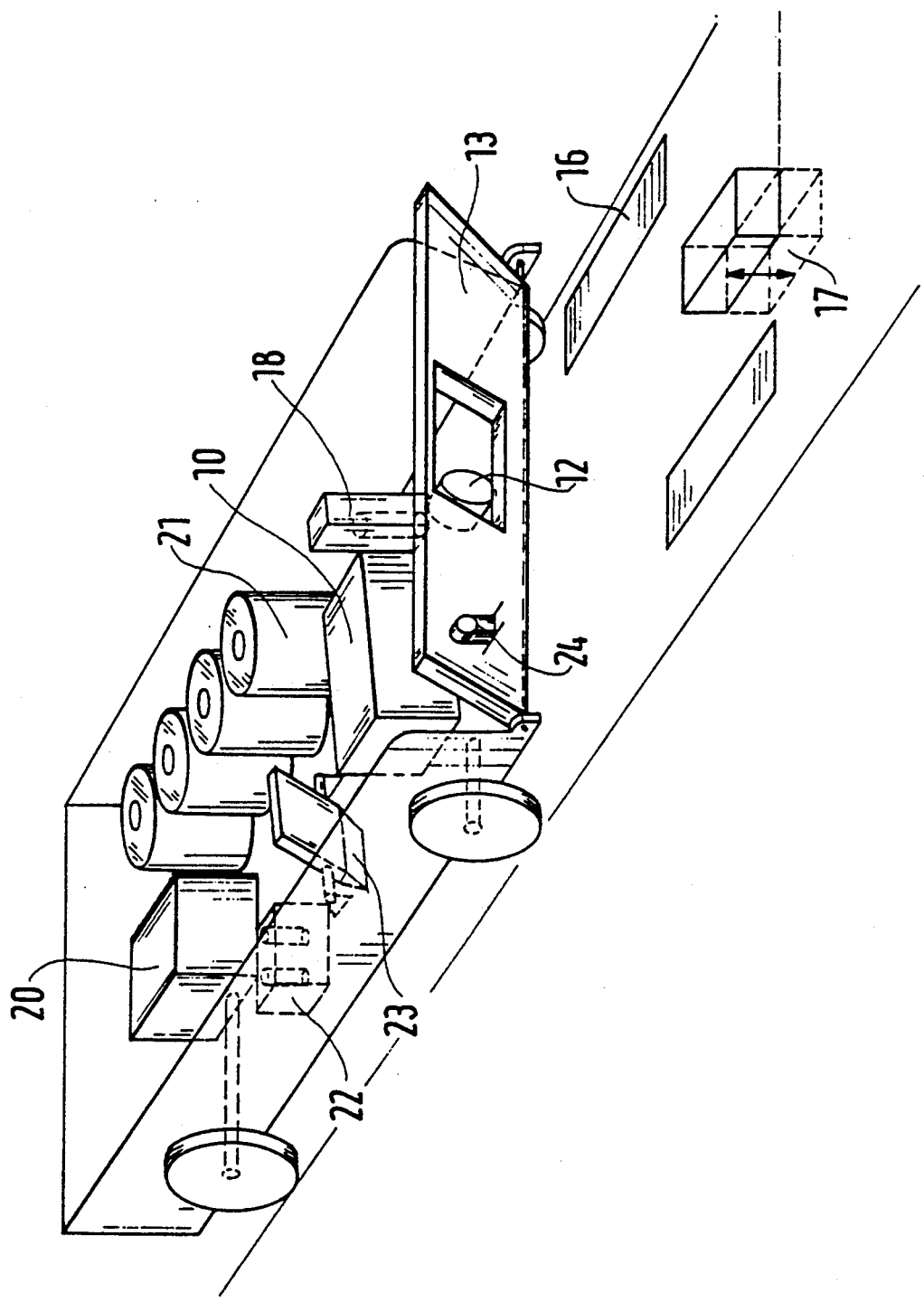
FIG. 1 shows a carrier with a system for controlling movement of the carrier according to the invention and a section of a travel path.

FIG. 1 shows a car with a section of the travel path in a schematic manner. Movement commands are -,fed to the car via sensors 12, 18, 22 and switches 23. The cars are outfitted with a distance sensor 12 directed in the travel direction, a pressure switch 13 in the form of a rocker which is arranged at the front, and an inductive sensor 18 at the bottom, a path sensor pair 22 and stop switch 23 arranged at the bottom. The switches 13, 23 and sensors 12, 18, 22 arranged at the car are activated by means of signal transmitter devices 16, 17 arranged in the travel path or by impact. Every car is outfitted with a central control unit in the form of a microcomputer 10 which is occupied with the coordinates of all signals supplied via the sensors and switches and controls all of the movements of a car. In addition, the microcomputer 10 is connected with all active car elements such as drive, sensors, switches, etc.

Figure 2:
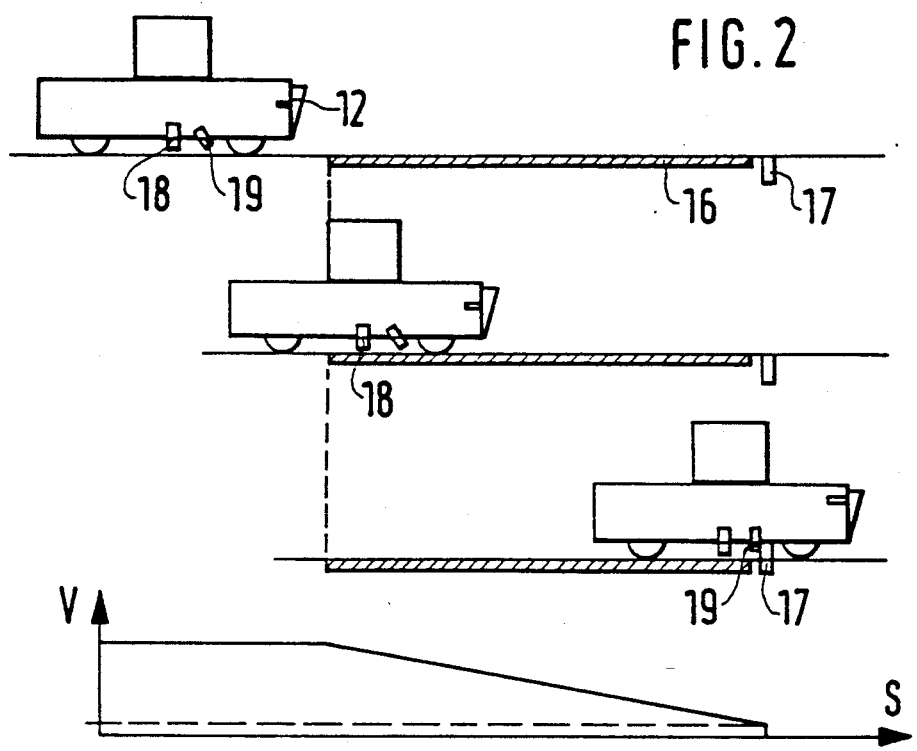
FIG. 2 shows the car moving into an unoccupied stopping point.

FIG. 2 shows a car 10 moving into an unoccupied stopping area. A shopping area comprises a signal strip 16 arranged on the travel path, an externally controllable mechanical barrier 17 marking the stopping point is located at the end of the signal strip 16. The length of the signal strip 16 is the same in front of all stopping points. The value of the signal strip length is stored in the microcomputer 10.

The inductive sensor 18 arranged on the bottom first detects the signal strip 16 when traveling over it and transmits a signal to the microcomputer 10. The microcomputer 10 then brakes the car so as to arrive exactly at the stopping point when the length of the signal strip 16 is known. The switch 19 arranged at the bottom is actuated at the end of the signal strip 16 by means of the mechanical barrier 17 and transmits a signal to the microcomputer 10 which then stops the car. A possible curve for the speed along a braking path during a regular stopping process of this kind is shown in a diagram by way of illustration. The traveled distance S is plotted as abscissa and the speed V is plotted as ordinate. Of course, the real course of the curve can deviate from the one that is shown; in particular, it need not be linear.

Figure 3:
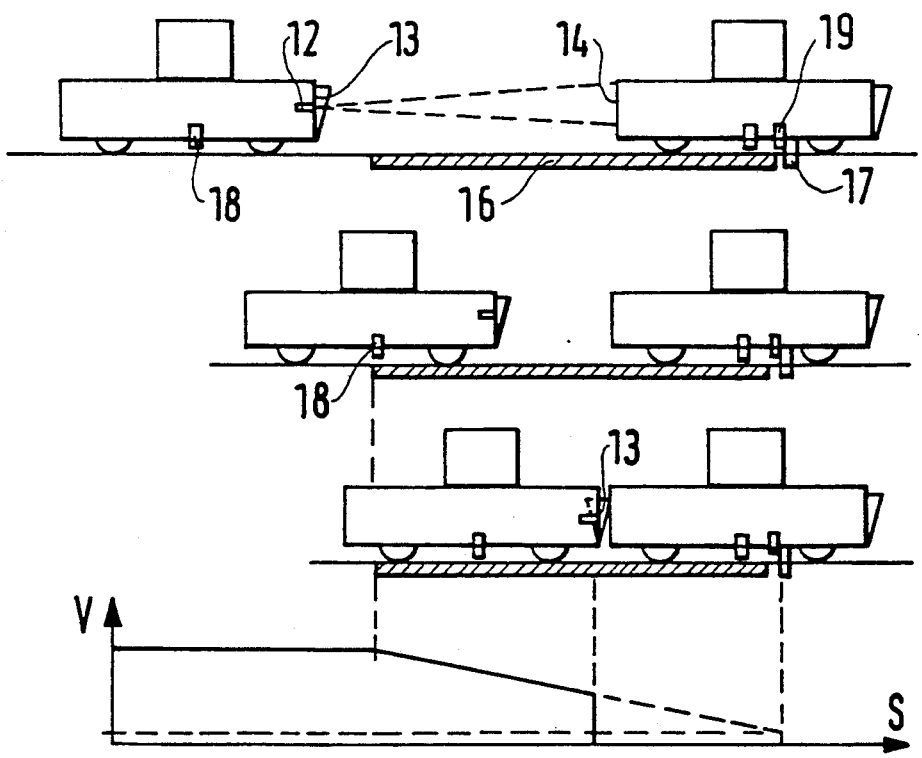
FIG. 3 shows the car moving into a stopping point which already occupied by another car.

FIG. 3 shows the movement of the car into a shopping area which is already occupied by another car. In this case, the distance sensor 12 first detects the rear 14 of the car standing in the stopping area area as an obstacle and accordingly triggers a braking process which reduces the speed of the car to a value corresponding to the distance. When passing the start of the signal strip the inductive sensor 18 arranged at the bottom is activated. The car then brakes so as to arrive exactly at the destination at the rear 14 of the second car standing in the stopping area. When impacting against the stationary car, which takes place at minimum residual speed, the front rocker 13 is actuated and the approaching car is then stopped. A diagram shows the curve of speed along the path in this instance by way of example. The distance traveled is designated by S, the speed of the car is designated by V.

If the distance sensor 12 works in a defective manner or does not functions at all and a car is already standing in a stopping area as shown in FIG. 3, the braking process is not triggered by the response of the distance sensor 12, but by the activation of the inductive sensor 18 arranged at the bottom. The latter transmits a signal to the microcomputer 10 which signals an unoccupied stopping area. In the absence of an additional signal from the distance sensor 12 signaling an obstacle, the microcomputer 10 executes the braking process so as to arrive exactly at the stopping point marked by the barrier 17. The car therefore collides against the rear 14 of the stationary car at an insufficiently braked speed and is stopped at this location by means of the front rocker 13 which is actuated at impact.

In order to prevent such a sharp impact, a signal evaluating logic provided in every car checks the time sequence of the activation of the sensors and switches. The signal evaluating logic is advisably realized in the microcomputer 10. In the case of the embodiment according to FIG. 3, the normal activation sequence of the sensors and switches is: distance sensor 12—bottom inductive sensor 18—front rocker 13. The sequence obtained as a result of a defective sensor function is: bottom inductive sensor 18—front rocker 13. Compared to the sequence for normal movement into a stopping area, the signal for the activation of the distance sensor 12 is absent when a car moves in with a defective distance sensor 12. The microcomputer 10 detects that a car function is defective by comparison with the regular sequence stored in the microcomputer 10. The microcomputer 10 then transmits an error signal and stops the car or isolates it at a suitable point.

Other devices serve to stop a car, particularly after impact against obstacles. The front switch which is constructed as a rocker 13 is constructed in two stages.

Figure 4:
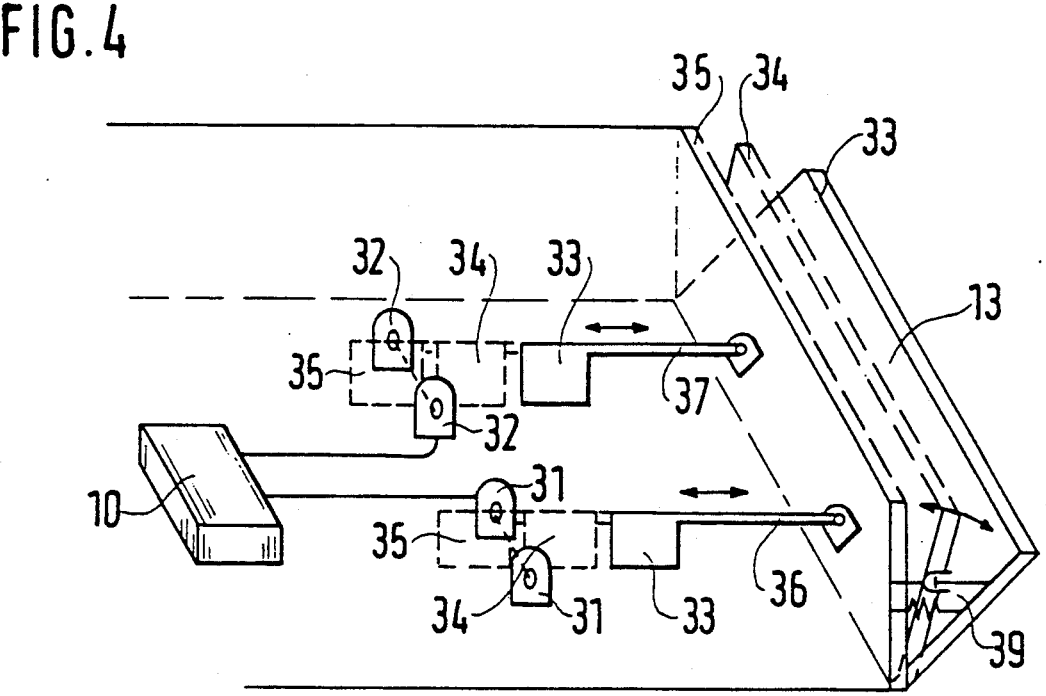
FIG. 4 shows a front switch of the carrier.

The first stage, position 34 in FIG. 4, is actuated by means of a regular impact, e.g. when a car drives into another car in a stopping point at crawl speed, the other car already being located in the stopping point. The switch then transmits a signal to the control unit 10 which temporarily stops the car on the basis of this signal. When there is no longer any pressure on the rocker 13, the rocker returns to the initial position 33. Accordingly, the signal corresponding to the rocker position 33 likewise ceases, whereupon the control unit 10 sets the car in motion again.

The second switching stage, position 35, is actuated during an irregular impact. This occurs, for instance, when a car drives against an obstacle located in the driving path, e.g. another stationary car, at maximum speed without braking as a result of a defective distance sensor. Such a hard impact occasioned in this way causes the second switch stage to be actuated. As a result of the signal transmitted to the control unit 10, the car is permanently stopped. External adjustment is then required for reactivation. The two-stage switching arrangement is preferably realized by means of light barriers 31, 32 and a concussion spring system 39. FIG. 4 shows an embodiment for this case. Two interrupter rods 36, 37 of different lengths are securely connected with the front rocker 13. The rocker is dynamically coupled to the car via the concussion spring system 39. The ends of the interrupter rods 36, 37 are guided between two light barriers 31, 32 which are mounted so as to be fixed at the car at equal distances from the front rocker. The two light barriers 31, 32 are connected with the control unit 10. In the initial position 33, the two interrupter rods 36, 37 do not interrupt the light barrier 31, 32 assigned to them. When the rocker 13 is actuated by pressure, the longer interrupter rod 36 slides between the light barrier 31 when acted upon by slight pressure and interrupts the latter. The light barrier assigned to the shorter interrupter rod 37 is not interrupted. The shorter interrupter rod 37 is displaced horizontally until it interrupts the light barrier 32 assigned to it only when there is great pressure as a result of a very hard impact. The signal transmitted by the light barrier 32 triggers a permanent stopping of the car in this case.

Further, a shock sensor 24 as shown in FIG. 1, is provided which likewise responds to an abnormally hard impact and transmits a signal on the basis of which the microcomputer 10 permanently stops the car. A threshold value for the momentum of impact can be predetermined from the outset, the shock sensor 24 being actuated when this threshold value is exceeded. The purpose of the shock sensor 24 is to trigger a permanent stopping of the car in such cases where an obstacle located on the travel path is not detected by the distance sensor 12 and the front rocker 13 does not respond. This can happen when an obstacle is located above the rocker 13 and only obstructs the load carried in the car. Naturally, it may happen that both the front rocker 13 and the shock sensor 24 respond to impact against an obstacle.

Figure 5:
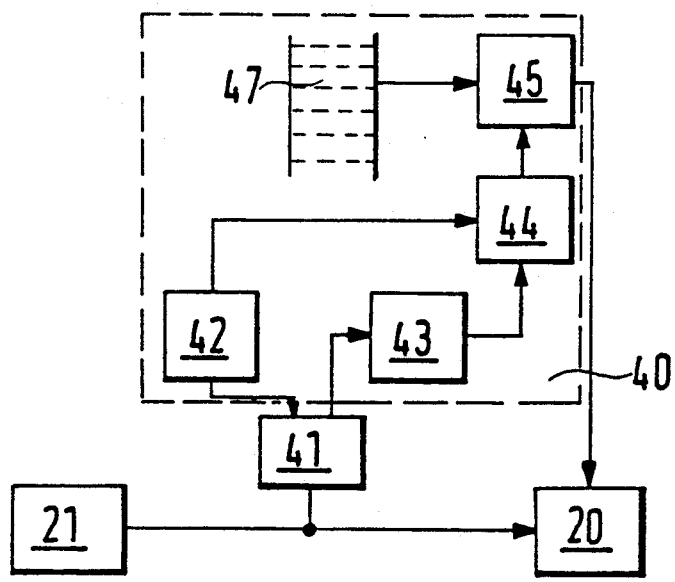
FIG. 5 shows a power consumption monitoring arrangement.

A power consumption monitoring arrangement 40 is shown in FIG. 5 and is provided as a further means of protection for monitoring the power taken from the battery 21. If a car expends high output beyond a differential time period without the speed of the car changing in a corresponding manner, the microcomputer 10 stops the car. This situation can come about when a car drives against a flat movable obstacle. In this case, neither the actuation of the front rocker 13 nor the activation of the shock sensor causes the car to stop. The car therefore attempts to reach the set speed at maximum output. The structure of such an arrangement is shown in FIG. 5 in a simplified manner. The power consumption monitoring arrangement 40 comprises a current measuring device 41 and signal processing 42–46 realized in the microcomputer 10. The current measuring device 41 is connected with the output of the batteries on the motor side. The output signal of the current measuring device is fed to the evaluating unit 40 as a power signal. The power consumption monitoring arrangement 40 is connected on the output side with the drive 20.

Figure 6:
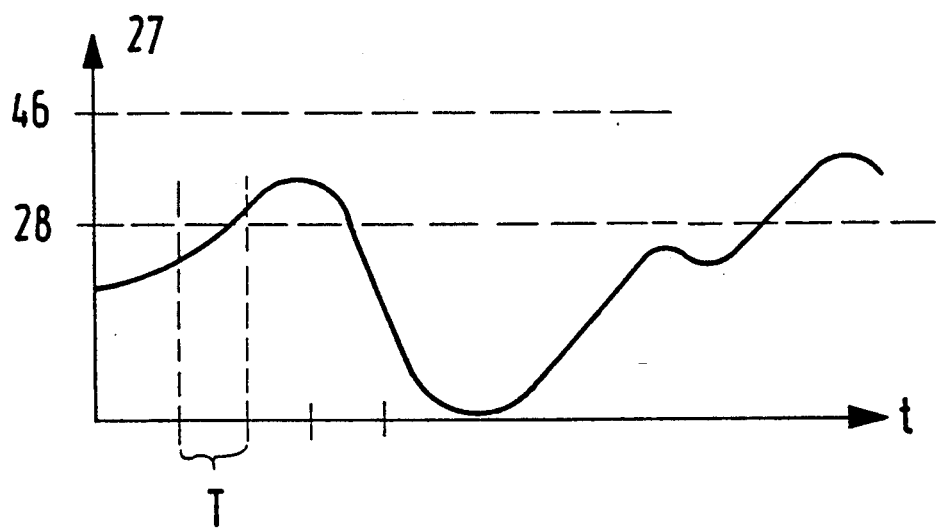
FIG. 6 shows a power consumption curve.

The output delivered to the drive 20 by the battery 21 is proportional to $I^2t$, wherein I is the current and t represents time. The power consumption monitoring arrangement 40 therefore contains a current measuring device 41 which determines the average current flow from the battery 21 to the motor 20 and generates a corresponding electrical signal. This signal is fed to a squaring means 43. The time period T of a current measurement taken by the current measuring device is determined by a time control unit 42. The squared signal supplied by the current measuring means 41 is multiplied by a signal delivered from the time control unit which corresponds to time T in a multiplier 44. The results correspond to the power taken from the battery during a time period T. A comparator 45 compares these results with a predetermined limiting value 46 stored in a memory 47. If the value formed in the multiplier exceeds the limiting value 46, the power consumption monitoring arrangement 40 transmits a signal to the drive 20, whereupon the car is permanently stopped. The time T and the limiting value 46 are generally fixed values which are stored in the evaluating unit 40. They are determined as a function of the operating requirement profile and the respective motor of the car. The two values are advisably determined on the basis of a typical power consumption curve plotted over a longer time period during regular operation, as is shown in FIG. 6. The value $I^2$ —designated by 27—is plotted over time t in this curve. Further, a time interval T, a line 28 corresponding to the average current and a possible line corresponding to the limiting value 46 are plotted by way of example.

The value T and the limiting value 46 can then be determined e.g. on the basis of the equation $$P \approx \sum^n i^2 T/n_2 - n_1,$$

where p is the average power loss in the interval $(n_2 - n_1)$, I is the average current, i is the average current in a measurement interval T, T is a time interval, $n_2$, $n_1$ are the numbers of the time intervals at the beginning and end of the total time period over which an average is taken. T is advisably selected in such a way that typically temporary overloading does not lead to the stopping of the car. The limiting value 46 should lie sufficiently above the value P so that fluctuations in output typical during operation do not lead to the stopping of the car. The suggested realization of the power consumption monitoring arrangement 40 serves as an example. Of course, it can also be constructed differently while operating in the same manner, especially since a significant portion of the circuit is realized in the form of software.

It is particularly advantageous to provide the described devices in combination. On the one hand, combining the devices protects the car in case the distance sensor 12 does not work perfectly. This can also be caused e.g. by dirt penetrating into the sensor. On the other hand, during normal operation of a transporting device there is an equal probability of a number of different irregular operating states, all of which can only be determined by means of a combination of devices. In particular, various obstacles come under this category. For example, a distinction must be made between soft and, hard, flat and high, movable and immovable obstacles. Flat obstacles or obstacles projecting in from above are not detected by the distance sensor 12, nor is the front rocker 13 actuated when the car runs up against such an obstacle when the front rocker is mounted at the same height as the base of the car. If the obstacle is immovable, in addition, the shock sensor 24 is activated upon impact. On the other hand, if the obstacle is movable the power consumption monitoring arrangement 40 responds. The car is stopped in either case. In another example, if a soft obstacle is situated on the travel path and the distance sensor 12 is soiled and therefore does not function, neither the shock sensor 24 nor the front rocker 13 responds. However, the car is stopped by means of the activation of the power consumption monitoring arrangement 40.

In a further example, if a hard, immovable obstacle suddenly falls on the travel path and the front rocker 13 is defective, the shock sensor responds when impacting against the obstacle and stops the car. Since it is especially significant for operation to detect a possible defect of the distance sensor 12 as quickly as possible, it is advantageous to also provide a signal evaluating logic in each instance. That is, if the distance sensor 12 is defective, but a defect in the distance sensor cannot be attributed with certainty, a car is protected by means of the additional safety devices.

While the invention has been illustrated and described as embodied in a signal processing system for controlling movement of a transporting device, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed as new and desired to be protected by Letters Patent is set forth in the appended claims.

We claim:

1. A transporting device comprising at least one autonomous workpiece carrier provided with an electric drive means connected to a drive control means; a path system provided for guiding said carrier; said drive control means including signal producing means provided for producing signals corresponding to operational parameters of said carrier and signal processing means provided for comparing an actual time sequence of the signals produced by said signal producing means with a predetermined time sequence stored in said drive control means; whereby, said drive control means has a function of stopping said vehicle in the event of a deviation of said actual time sequence from said predetermined time sequence.

2. A transporting device as defined in claim 1, wherein said signal producing means includes a distance sensor which produces a signal in response to the presence of an obstacle for said workpiece carrier in said path system.

3. A transporting device as defined in claim 1, wherein said signal producing means includes a sensor which produces a signal in response to driving of said workpiece carrier in a stopping area of said path system.

4. A transporting device as defined in claim 3; and further comprising a signal strip arranged in said shopping area of said path system, said sensor being formed as an inductive sensor detecting said signal strip when traveling over it.

5. A transporting device as defined in claim 4, wherein said signal processing means operates to store the value of a length of said signal strip and to brake said workpiece carrier before a stopping point in said stopping area.

6. A transporting device as defined in claim 5, wherein said signal producing means including a mechanical barrier arranged at an end of said signal strip and marking said stopping point and a switch arranged on said workpiece carrier and actuated by said mechanical barrier so as to stop said workpiece carrier.

7. A transporting device as defined in claim 1, wherein said signal producing means includes a switch arranged at a front side of said workpiece carrier and operative in response to a mechanical contact.

8. A transporting device comprising at least one autonomous workpiece carrier provided with an electric drive means connected to a drive control means; a path system provided for guiding said carrier; the drive control means including a pressure responsive switch means in the form of a rocker arranged in front of said carrier; said rocker having an initial position, a first switching position and a second switching position; whereby, in response to a regular impact to the front of the carrier, said rocker is moved from the initial position to the first switching position; in response to an irregular impact harder than said regular impact, said rocker is moved from the initial position passing the first switching position to the second switching position; the drive control means has a function of temporary stopping the carrier in response to the rocker moved to the first switching position and permanent stopping the carrier only in response to the rocker moved to the second switching position.

9. A transporting device as defined in claim 8, wherein said switch means further comprises two rods having different lengths connected to said rocker, and light barriers associated with said rods, said two rods including a long rod arranged to interrupt one of said light barriers when said rocker is in the first switching position, and a shorter rod arranged to interrupt another one of said light barriers when said rocker is in the second switching position; and wherein the interruptions of said light barriers produce signals received by the drive control means.

10. A transporting device as defined in claim 8, and further comprising a spring dampening system which dynamically couples said rocker with said workpiece carrier.

11. A transporting device comprising at least one autonomous workpiece carrier provided with an electric drive means connected to a drive control means; a path system provided for guiding said carrier; said drive control means including stopping means for temporary stopping the carrier upon a regular impact and for permanent stopping the carrier when an irregular impact; said stopping means including a shock sensor means arranged in said carrier for producing a signal upon said irregular impact; whereby said drive control means has a function of permanent stopping the carrier in response to said signal of said shock sensor means.

12. A transporting device comprising at least one autonomous workpiece carrier provided with an electric drive means connected to a drive control means and a battery; a path system provided for guiding said carrier; said drive control means including a power consumption monitoring means for comparing the rate of energy withdrawn from said battery by said electric drive means with a predetermined value; whereby said drive control means has a function of stopping said carrier in response to a signal of said power consumption monitoring means when the rate of energy withdrawn from said battery exceeds the predetermined value.

13. A transporting device as defined in claim 12, wherein said electric drive mans includes a motor connected to said battery, and said power consumption monitoring means includes a current measuring device, connected at a battery output located at a side of said motor, for determining a current drawn by the motor.

14. A transporting device as defined in claim 13, wherein said power consumption monitoring means includes squaring means, a time control unit, a multiplier, comparator and a memory, said squaring means squaring an output signal of said current measuring device and supplying a squared output signal to said multiplier, said multiplier multiplying said squared output signal by a signal supplied by said time control unit and supplying a multiplied output signal to said comparator, said comparator comparing said multiplied output signal with a value in said memory.

* * * * *